L. W. PROEGER.
METHOD OF DELIVERING MOLTEN GLASS TO MOLDS.
APPLICATION FILED JUNE 17, 1914.

1,143,317.

Patented June 15, 1915.
2 SHEETS—SHEET 1.

WITNESSES.
J. R. Keller
John F. Will

INVENTOR.
Louis W. Proeger
By Kay Totten Powell
Attys

L. W. PROEGER.
METHOD OF DELIVERING MOLTEN GLASS TO MOLDS.
APPLICATION FILED JUNE 17, 1914.

1,143,317.

Patented June 15, 1915.
2 SHEETS—SHEET 2.

WITNESSES.
J. R. Keller
John F. Wall.

INVENTOR.
Louis W. Proeger

UNITED STATES PATENT OFFICE.

LUIS W. PROEGER, OF PITTSBURGH, PENNSYLVANIA.

METHOD OF DELIVERING MOLTEN GLASS TO MOLDS.

1,143,317.          Specification of Letters Patent.    Patented June 15, 1915.

Application filed June 17, 1914. Serial No. 845,564.

*To all whom it may concern:*

Be it known that I, LUIS W. PROEGER, a citizen of the United States, and resident of Pittsburgh, in the county of Allegheny and State of Pennsylvania, have invented a new and useful Improvement in Methods of Delivering Molten Glass to Molds; and I do hereby declare the following to be a full, clear, and exact description thereof.

My invention relates to a method of cutting off and delivering molten glass from the receptacle containing same, in measured quantities to molds or other receptacles.

The object of the invention is to provide a method for the automatic discharge of molten glass from the furnace or other receptacle containing same, so that the glass will be delivered in measured quantities to the mold, by cutting off the glass each time at the point of discharge, without chilling the glass, and causing same to collect around the discharge opening and thus prevent the proper flow of the glass.

My invention consists, generally stated, in the method of discharging and cutting off molten glass from a glass delivering apparatus, having a main upper outlet and lower outlet connected by a closed passage, consisting in collecting a quantity of glass in the said passage between said outlets, discharging said mass of glass, elongating the glass from the upper outlet to a portion narrower than the size of said lower outlet, and cutting off the glass at this elongated portion.

In the accompanying drawings, I have illustrated a form of apparatus suitable for carrying out my improved process, in which—

Figure 1:
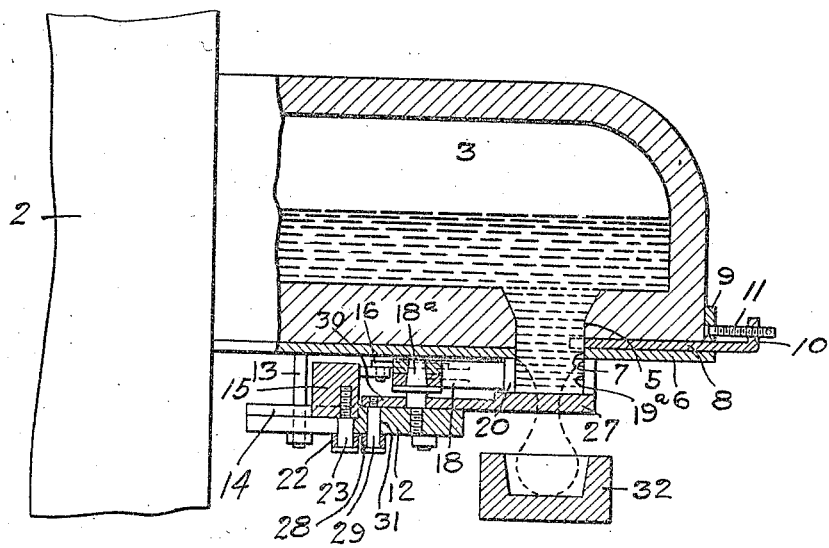
Figure 2:
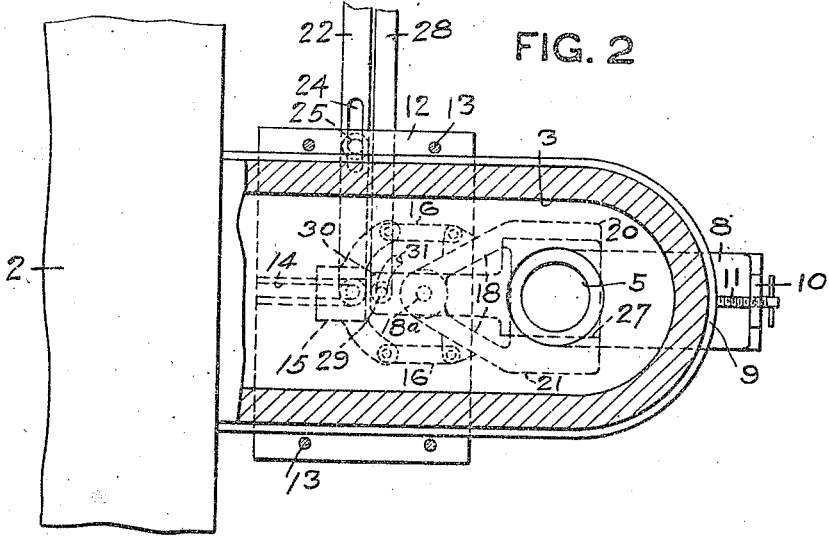
Figure 3:
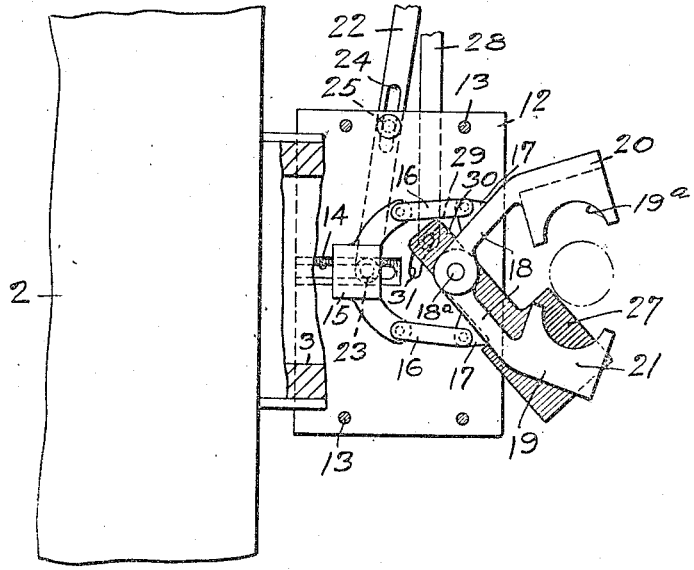
Figure 4:
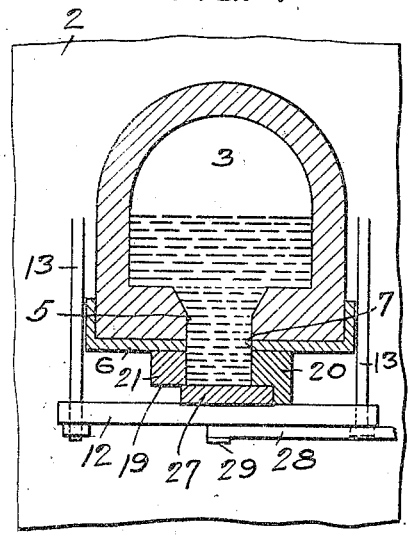
Figure 5:
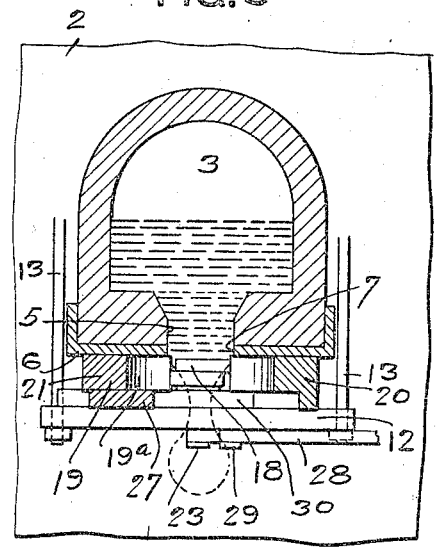

Figure 1 is a sectional view of a receptacle containing the molten glass, with the apparatus applied thereto, the parts being illustrated in the cutting-off position; Fig. 2 is a horizontal section of the receptacle containing the molten glass, the cutting off apparatus being shown in dotted lines; Fig. 3 is a plan view of the cutting-off apparatus, showing the parts open; Fig. 4 is a cross-section showing the parts in cutting-off position; and Fig. 5 is a like view showing the shearing or cutting-off member withdrawn.

The apparatus which I have illustrated as suitable for carrying out my invention is one which forms the subject matter of a separate application for Letters Patent of the United States, filed by me November 13, 1912, Serial No. 731,203.

The numeral 2 designates a suitable tank or furnace for melting the glass and connected with said furnace is the receptacle 3 containing the molten glass which flows into said receptacle from the furnace 2. The receptacle 3 is provided with the discharge opening 5, the walls of said discharge opening being chiefly formed of the refractory material forming the bottom of said receptacle, said bottom, however, being provided with a reinforcing plate 6 with an opening 7, registering with the discharge opening of said receptacle. In order to regulate the size of the discharge opening, I provide a plate 8 which is movable in a guide 9 in the receptacle 3. This plate is provided with the flange 10 through which the threaded bolt 11 passes, so that by turning of said bolt, the plate 8 is moved to and fro to control the size of discharge opening 5.

Below the receptacle 3 is the supporting plate 12 which is carried by rods 13. This plate has the guide 14, and a yoke member 15 is adapted to move back and forth in said guide. The yoke 15 has the links 16 pivotally connected thereto, and the outer ends of said links are pivotally secured to lugs 17 on the arms 18 of the partible discharging member 19 formed in two halves, 20 and 21. The two parts when united form the opening 19ª, which registers with the openings 5 and 7, so that the molten glass from the receptacle 3 can pass through the movable discharge member 12. The arms are mounted on stud 18ª, which is threaded into the plate 12. A lever 22 is adapted to open and close the halves of the discharge member 19, and the inner end of said lever is connected by the bolt 23 to the yoke 15. The lever 22 has the slot 24 which engages the pin 25 on the supporting plate 12. It is apparent that by moving the arm 22 the yoke 15 is moved in the guide 14 and through the links 16, the halves 20 and 21 are opened and closed. A cut-off or shearing member 27 is also mounted on the stud 18ª, and said shearing member is operated by the lever 28, which has the pin 29 connected to the arm 30 of said shearing member, and said pin 29 moves in slot 31 in the supporting plate 12. By operating the lever 28, the shearing member is moved in and out of shearing position. Said partible discharge member 19 and the shearing member 27 form a closed extension or passage to the receptacle 3 and said extension contains preferably a less quantity of glass than that required for the article to be formed.

In carrying out my improved method by the above apparatus, the receptacle 32 to receive the molten glass is brought into proper position, whereupon the arm 28 is operated to withdraw the shearing member 27. Where apparatus like that illustrated is employed, immediately following the withdrawal of the shearing member 27, the halves of the discharge member are separated by operation of the lever 22, permitting the molten glass to drop in a mass from said extension into the receptacle or mold 32, and this mass, connected with the glass contained within the receptacle 32 is followed up by said molten glass, which elongates as it flows downwardly into substantially the shape indicated in dotted lines Fig. 1.

When the proper amount of glass has been delivered to the receptacle 32, the halves of the discharge member are closed and immediately following, the shearing member 27 is brought into a closed position, and, in its movement, acts to shear or cut off the supply of molten glass. In this manner, the glass contained within the extension formed by the discharge member 19, and the cut-off member 27 is discharged into the mold or receptacle 32 below, and in addition a portion of the glass is discharged through the discharge outlet 5 from the receptacle 3, until the amount of glass required to make the article has been delivered to the mold or other receptacle 32. By freeing the glass from the walls of the extension each time the glass is delivered to the mold, the glass is prevented from chilling or clogging up the discharge opening as the shearing member cuts off the glass at the outlet of the movable discharge member, and the glass at this point is elongated so as to be narrower than the outlet of the movable discharge member, so that in cutting off the glass, the knife does not cut a portion of the glass of the same dimensions as the discharge outlet. The main point of the advantage in my improved method is the fact that the elongated portion of glass to be cut off by the knife is of smaller size than the outlet and at the same time, after each operation the passage or extension is closed against exposure to the atmosphere, which reduces the liability of the chilling of the glass before it passes into the mold. In actual operation when the knife is withdrawn, and the partible discharge member is opened, the glass contained within the extension drops in a mass, followed by the hotter glass from the receptacle 3, which immediately elongates and assumes a size at the movable discharge outlet of less size than said outlet, so that when the parts of the movable discharge member are closed and the knife brought around to cut off the glass, the knife has only to cut this narrow elongated portion and the chilling of the glass and clogging up of the discharge member are obviated. The glass is discharged in even and uniform quantities to the receptacle below, and the glass is in such plastic condition as to be distributed properly in the formation of the article.

It is obvious that other forms of apparatus other than that illustrated may be employed for carrying out the above described method.

What I claim is:

1. The method of discharging and cutting off molten glass from a glass delivering receptacle having an upper outlet and a lower outlet connected by a closed passage, consisting in collecting a mass of glass in said passage between said outlets, and discharging said mass of glass, elongating the glass from the upper outlet to a portion narrower than the size of said lower outlet, and cutting off the glass at the lower outlet at such elongated portion.

2. The method of discharging and cutting off molten glass from a glass delivering receptacle having an upper outlet and a lower outlet connected by a closed passage, consisting in collecting a mass of glass in said passage between said outlets, discharging said mass by freeing it from the walls of said passage, elongating the glass from the upper outlet to a portion smaller than the size of said lower outlet, and cutting off the glass at the lower outlet at said elongated portion.

3. The method of discharging and cutting off molten glass from a glass delivering receptacle, consisting in drawing off from the main supply of molten glass a portion less than that required to form the article and confining said portion of glass while still united to the main supply, freeing said portion of glass on all sides, thereby dropping said portion of glass together with an added portion from the main supply, elongating the added portion, and cutting off the glass at such elongated portion.

In testimony whereof, I the said Luis W. Proeger have hereunto set my hand.

LUIS W. PROEGER.

Witnesses:
John F. Will,
J. R. Keller.